United States Patent [19]

Beaujean

[11] Patent Number: 4,528,654
[45] Date of Patent: Jul. 9, 1985

[54] DUSTPROOF CASE FOR AN OPTICAL INFORMATION TAPE INCLUDING A CLAMPING LENS

[75] Inventor: Joseph M. E. Beaujean, Venlo, Netherlands

[73] Assignee: Bogey B.V., Venlo, Netherlands

[21] Appl. No.: 192,043

[22] Filed: Sep. 29, 1980

[30] Foreign Application Priority Data

Oct. 1, 1979 [NL] Netherlands .......................... 7907293

[51] Int. Cl.³ .......................... G11B 7/12; G11B 23/12
[52] U.S. Cl. .................................... 369/100; 369/112; 369/113; 369/115
[58] Field of Search .......................... 369/109, 112–115, 369/117–118, 100, 258, 119; 360/132; 352/72, 78 R, 231, 228; 364/50; 354/203

[56] References Cited

U.S. PATENT DOCUMENTS

| 1,638,059 | 8/1927 | Pucek | 369/119 |
| 1,856,524 | 5/1932 | Whitaker et al. | 369/113 |
| 1,989,836 | 2/1935 | Whitman | 369/112 |
| 1,996,732 | 4/1935 | Whitman | 369/114 |
| 2,039,436 | 5/1936 | Moore | 369/114 |

FOREIGN PATENT DOCUMENTS 415177  8/1934  United Kingdom ............... 369/112

Primary Examiner—Raymond F. Cardillo, Jr.
Attorney, Agent, or Firm—Martin Smolowitz

[57] ABSTRACT

An apparatus for controlling the monoplanar motion of an object, more in particular a tape containing optically readable information, comprising two opposite clamping means on either side of the object. The object as well as at least one of the clamping means are accommodated within a dustproof case. One of the clamping means can be moved relative to the other by generating an (electro)magnetic field outside the case.

2 Claims, 1 Drawing Figure

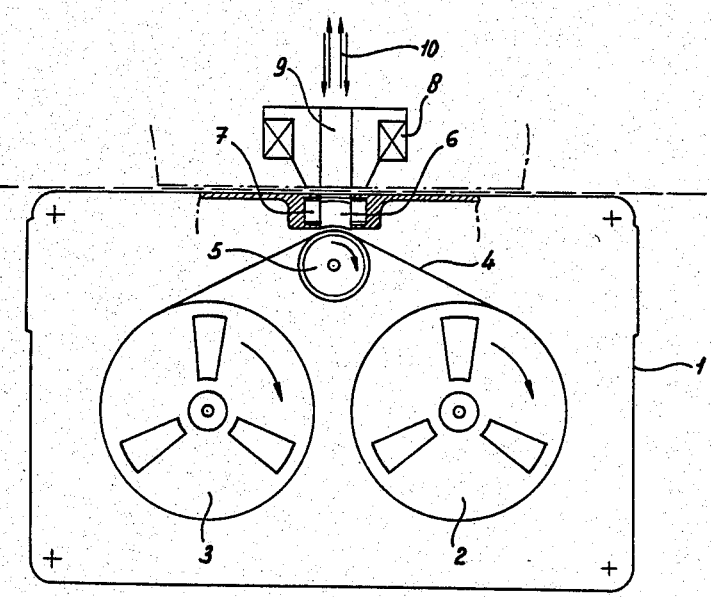

DUSTPROOF CASE FOR AN OPTICAL INFORMATION TAPE INCLUDING A CLAMPING LENS

BACKGROUND OF THE INVENTION

The present invention relates to an apparatus for controlling the monoplanar motion of an object, said apparatus comprising two opposite clamping means on either side of said object, one of which clamping means is operative to be moved between two extreme positions in a direction perpendicular to said plane of motion and with respect to the other clamping means, the one clamping means in one of the extreme positions thereof fixedly clamping said object between the two clamping means and in the other of said clamping positions allowing the movement of said object between said clamping means, and means for exerting a force on the one clamping means directed at least partially from or to, respectively, the other clamping means wherein said one clamping means is connected to one or more pieces of ferromagnetic and/or electrically conductive material.

The present invention furthermore relates to a case for a tape-like information carrier provided with such an apparatus for controlling the motion of the information carrier as well as to an apparatus for reading, writing or erasing information on a tape-like carrier to be used in combination with such a case.

An apparatus of the type indicated above for controlling the monoplanar motion of an object is known among others from the German Patent Specification No. 420,302. This patent specification discloses a film projector in which the film to be projected is guided between two windows. If the electromagnet coupled to one of the windows is not energized, the two windows are spaced at some distance with respect to each other and the film strip to be projected may pass freely between the windows. Upon energization of the electromagnet the windows are pressed again each other and the film strip will be clamped therebetween.

A similar apparatus is also known from the Netherlands Patent Application No. 66.09173. This patent application describes an apparatus in which an information carrying tape may be read. This apparatus includes one or more brake shoes which are pressed against the tape at an almost constant force by means of a leaf spring. If the tape has to be stopped the force at which the brake shoes are pressed against the tape is suddenly increased by energizing an electromagnet.

In accordance with the two literature references discussed above clamping means are pressed against a moving object or a pressing force already present is increased by the application of an (electromagnetic field. It is also possible, however, that there are provided means, permanently exerting a force on the clamping means whereby said clamping means are pressed against a moving object and that upon the application of an (electromagnetic field this force is compensated completely or partially.

Many information carriers are very sensitive to dust. The drawback of the above discussed apparatuses is that they are not of dustproof character and that the information carrier therein will consequently be subject to damage caused by dust.

SUMMARY OF THE INVENTION

The object of the invention is to provide an apparatus for controlling the monoplanar motion of an object, which apparatus together with the object is shut off from the surroundings in a dustproof manner on the one hand and which apparatus on the other hand consists only of a minimum required number of parts.

This object is achieved by means of an apparatus of the type indicated above for controlling the monoplanar motion of an object, said apparatus being characterized in accordance with the invention in that the object as well as at least one of said two clamping means are accommodated within a dustproof case and that the pieces of ferromagnetic and/or electrically conductive material are arranged within this case in such a manner that upon generation outside said case of an appropriate (electro) magnetic field they will exert a force on the one clamping means directed at least partially to or from, respectively, the other clamping means.

The present invention relates more in particular to such an apparatus in which the object, the movement of which is to be controlled, is a tape. The clamping means and the tape are accommodated together within a dustproof case, but the means for generating an (electro) magnetic field by means of which these clamping means may be controlled are located outside said case. The construction of this case may therefore be light and cheap. In an apparatus according to the invention there will usually be means for exerting a force on said tape in the longitudinal direction thereof. Such means normally consists of two reels on which a tape-like information carrier is mounted. The apparatus for controlling the speed of the information carrier is present between said reels.

Usually each one of the reels will be a rotatable part on which the tape may be wound or from which the tape may be unreeled, respectively. There is, however, also conceivable a construction in which the tape is wound on the outside of a reel while the tape is simultaneously unreeled from the inside of the same reel. In this case there will be provided also a driven roller over which the tape will run optionally in combination with a backing roller pressing the tape against the driver roller. In the present specification such a roller will also be indicated by the term reel, so that the construction described above is also covered by the expression "an apparatus provided with two reels."

If the tape is provided with information that may be read optically it may be advantage to include an optical lens in one of the clamping means, the surface of which lens may be pressed against the tape and optionally to make the surface of the other clamping means facing the tape reflective.

DESCRIPTION OF THE INVENTION

The invention will now be elucidated in further detail with respect to the accompanying drawing. In this drawing is shown a cross sectional view of a case 1 provided with two reels 2 and 3 on which a tape 4 is wound provided with information that may be read optically. Mounted between the reels is the apparatus according to the invention for controlling the speed of the tape 4 which consists of two parts, i.e. a rotatably supported wheel 5 with an approximately cylindrical reflective side over which the tape 4 runs and a cylindrical lens 6 which is surrounded by and fixedly connected to a ring 7 of magnetic or magnetizable material. The wheel 5 constitutes a static clamping means whereas the cylindrical lens 6 together with the ring 7 of magnetic or magnetizable material arranged in such a manner that it may be moved in vertical direction constitutes the movble clamping means. Furthermore there is provided a spring (not shown in the drawing) pressing the movable clamping means 6, 7 against the tape 4, consequently clamping the tape 4 in a fixed position between the cylindrical lens 6 and the reflective wheel 5.

Outside the case 1 there is arranged an energizing coil having a polar piece 8, by means of which an electromagnetic field may be generated penetrating through the wall of the case 1 to the location of the ring 7. Upon energization of the coil 8 the ring 7 together with the cylindrical lens are pulled up against the force of the spring, thus releasing the clamping of the tape 4. The polar piece is provided with an opening 9 (running vertically in the drawing) through which a light beam 10 from the outside may reach lens 6 and through said lens also the tape 4 and the reflector 5, and through which in the reverse direction beam 10a reflected by the tape 4 and the reflector 5 may leave.

It is also possible to mount the spring in such a manner that this spring urges the movable clamping means 6, 7 from the tape, whereas the coil is mounted in such a manner that upon energization the coil will press the movable clamping means 6, 7 against the tape.

A case accommodating a tape with information that may be read out optically and provided with an apparatus according to the invention may be utilized in an apparatus for writing, reading or erasing optically readable information. The case should then be mounted in a cavity of such an apparatus for writing, reading or erasing in a predetermined position. The apparatus is provided with a coil, so that upon the presence of a case in the cavity this coil will be in proper position with respect to the case and will be capable of generating an electromagnetic field at the location of the movable clamping means present in said case.

The apparatus for writing, reading or erasing may be furthermore of such a design that the information is read from one track extending in the longitudinal direction along the tape. Furthermore there is provided a control means to which the information read out is supplied. This control means is of such a design that the force exerted by the clamping means on the tape is in agreement with the information read from the tape. More in particular, the control means may be of such a design that if there is read information indicating that additional information is present alongside said track on the tape, the force exerted on the tape by the clamping means through said control means and the coil becomes so big that the tape will come to a stand still. The information present alongside said track may then be read.

Furthermore the apparatus for writing, reading or erasing may be provided with a clock sending pulses to the control device at regular intervals. The control means is of such a design that upon receiving a clock pulse, this control means will release clamping of the tape by way of the coil and the clamping means, whereupon the tape starts moving again. The reading of the information present on the said track is then resumed until there is read again a special information indicating the presence of additional information alongside the track on the tape.

Finally the apparatus for writing, reading or erasing may be provided with a control means for controlling the speed of the tape in such a manner that during a period of time elapsing between two clock pulses the tape is moved during half a period and is clamped during half a period. The energization of the clamping means then occurs periodically in accordance with a sine function (plus a number of even harmonics). Thereby a electromechanical attunement becomes feasible whereby the energization will require less energy and the requirements with respect to the electromagnetic coupling between the apparatus for writing, reading and erasing and the case accommodating the tape will become less stringent. Likewise the tension in the tape will be reduced thereby to a minimum.

I claim:

1. A dustproof case containg an optical information carrier tape wound on two reels between which an apparatus is provided for controlling the monoplanar motion of said optical information carrier tape by clamping between a first and second clamping means. wherein said first clamping means includes an optical lens and is connected to a feromagnetic piece, said second clamping means including a reflective surface means facing said tape, wherein an hour surface of said lens intermittently contacts said reflective surface means through said tape to control the motion of the tape therebetween, and wherein no internal electromagnetic field generating means are included in said case so that said first clamping means moves relative to the second means in respones to an external electromagnetic field to control movement of said optical information carrierd tape.

2. A dustproof case as recited in claim 1 wherein said reflective surface means is a rim of a wheel.

* * * * *